Patented Aug. 29, 1933

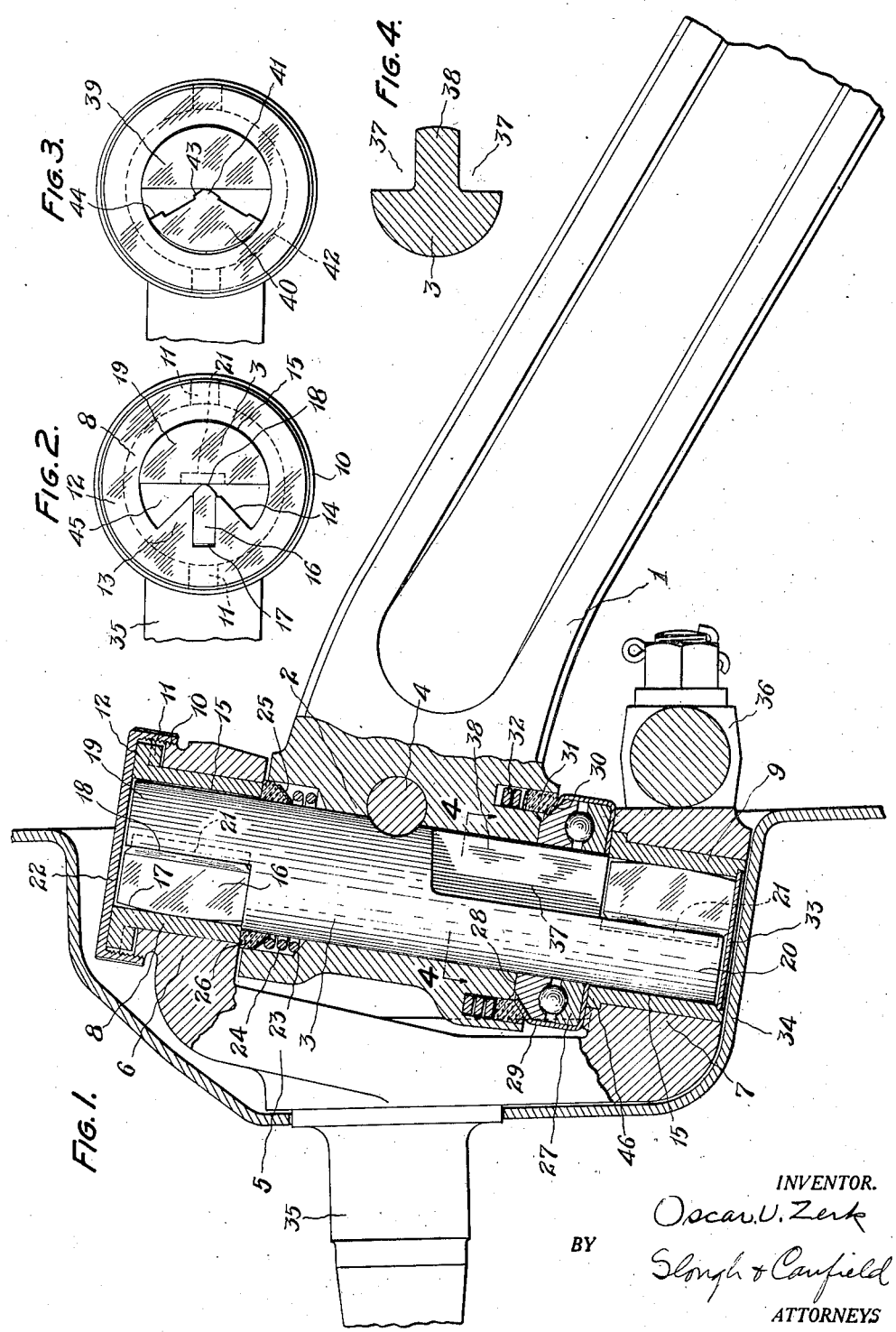

1,924,586

UNITED STATES PATENT OFFICE 1,924,586

SHAFT AND SPINDLE BEARING

Oscar U. Zerk, Cleveland, Ohio

Application April 12, 1932. Serial No. 604,773

19 Claims. (Cl. 280—96.1)

This invention relates to bearings and hinges in general and more particularly to axle and wheel spindle bearings such as are employed on front axles of automobiles.

King pin bearings such as are at present employed on the majority of makes of automobiles, comprise journals at each end of the king pin within which rounded ends of the king pins are rotatably disposed, these bearings being designed to take the force due to the inclined mounting of the king pin and a substantially lateral leverage couple exerted thereagainst by force transmitted to the steering knuckle by the wheel spindle, and a ball thrust bearing employed to generally take the load due to the weight of the car.

King pin bearings of the first mentioned type, create a relatively large amount of friction due to the large area of contact between the journal and the bearings thereby requiring relatively more steering effort and consequently have required constant lubrication. These bearings are subjected to continuous radial rocking movements due to the steering of the car and the hammering movement against this bearing surface caused by uneven roads, and therefore considerable wear of the bearing occurs. If the lubrication of this bearing is not properly effected at all times, or if the lubricant is not of a sufficiently good quality for the purpose, these bearings will partially "cake up" (freeze) and thereby wear out, requiring a still greater steering effort to direct the automobile.

In the present invention I provide an improved bearing mechanism which, while of more general application, has a special application to the provision of an improved bearing means for automotive vehicle steering spindles, and in which relative movement of the bearing parts is effected in such a way that the usual troubles due to faulty lubrication or the lack of it, are very noticeably absent. I contemplate constructions within the purview of this invention, wherein during the entire useful life of an automobile the king pin bearings associated with the steering wheels will not require to be lubricated, either by never providing them with lubricant, or at least constructing them so that an initial lubricating operation will be sufficient for the life of the automobile.

Due to the fact that the bearing elements I employ rock or roll against each other and that hardened rustless or stainless carbon chromium steel is employed to form their bearing surfaces, little or no lubricant is needed for these bearings. The use of stainless steel prevents any formation of rust, ensuring contact at all points of the bearing surfaces and thereby prevents the ingress of dust and grit which would imperil the dry bearing surfaces. The use of knife edge bearings and/or the interposing of balls or rollers prevents any considerable sliding movement and reduces consequent friction to a minimum.

It is an object of my invention therefore to provide an improved king pin bearing wherein the bearing elements roll while in contact with each other with a minimum amount of sliding movement.

Another object of my invention is to provide a king pin bearing which will permit a universal movement of the bearing elements.

Another object of my invention is to provide a king pin bearing, wherein there will be no abrasive action or a negligible amount between the bearing elements.

Another object of my invention is to provide a king pin bearing which is effectively sealed against the entry of foreign material to the bearing surface.

Another object of my invention is to provide in a king pin bearing, a king pin having a substantially cylindrical central portion and substantially semi-cylindrical ends oppositely disposed and provided with preferably self-sealing packings situated intermediate the semi-cylindrical end portions.

Another object of my invention is to provide in a king pin bearing adapted to be interposed between an axle and an oscillating wheel spindle, a king pin having two ends forming part of the king bolt, said ends being provided with substantially axially situated bearing surfaces against which substantially knife edge formed bearing members are contacting, said knife edge bearing members being adapted to be actuated by the movement of the yoke members connected with the wheel spindles of a vehicle.

Another object of my invention is to provide a king pin bearing adapted to be placed between an axle and an oscillating wheel spindle, provided with a king pin having two ends forming part of the king bolt, said ends having substantially axially situated bearing surfaces against which substantially knife edge formed bearing members pressed, said knife edge bearing members adapted to be actuated by the movement of the yoke members connected with the wheel spindles of an automobile, said knife edge bearing members being adapted to rock longitudinally in addition to a transverse radial crossing.

Another object of my invention is to provide a king pin bearing placed between an axle and an oscillating wheel spindle wherein the king pin is provided with two ends forming part of the king bolt, said ends having substantially axially situated bearing surfaces oppositely disposed against which substantially knife edge formed bearing members are pressing, and which are adapted to be actuated by movements of the yoke members connected with the spindles of an automobile, said knife edge members being oppositely disposed and adapted to rock in a direction generally longitudinal of the king pin in addition to a radial rocking action therewith.

Another object of my invention is to provide a king pin bearing placed between an axle and an oscillating wheel spindle employing a king pin having two ends forming part of the king bolt, said ends being provided with substantially axially situated bearing surfaces oppositely disposed, against which oppositely disposed knife edge bearing sectors are pressing, the said rocking knife edge sector being adapted to move relatively radially of the bushing within which it is housed or other parts connected to the yoke member of the bearings.

Another object of my invention is to provide in an axle and spindle king pin bearing the combination of knife edge bearings adapted to take substantially all of the horizontal thrusts and a ball or roller bearing adapted to take the vertical thrust.

Another object of my invention is to provide in an axle and spindle king pin bearing comprising two knife edge end bearings for the king pin, a ball bearing packing means disposed adjacent one knife edge bearing to prevent the entry of foreign substance therein and a second packing means placed adjacent the other knife edge bearing and adjoining the ball thrust bearing to prevent the entry of foreign substances to said ball thrust bearings.

Another object of my invention is to provide an axle and wheel spindle king pin bearing of the knife edge type wherein the generally horizontal pressures exerted at both ends of the bearing are in opposing directions, the use of a ball bearing to take up the vertical load and means to prevent the entry of foreign substances to the ball bearing and the lower yoke member against which this ball bearing presses.

Another object of my invention is to provide an axle and wheel spindle king pin bearing of the knife edge type wherein the knife edge bearings are disposed at both ends of the king bolt, and wherein all contacting bearing members are hardened and one or more recesses are placed near the intermediate portions of the king bolt in order to lighten the same and concentrate the thrust transmitted from the axle to the king bolt.

Referring now to the drawing, Figure 1 shows a fragmentary view partially in section of a king bolt assembly employing a preferred embodiment of my invention.

Fig. 2 shows a cross section through one of the knife edge bearings illustrated in Fig. 1 wherein a rocking blade is inserted in a rigidly connected bushing.

Fig. 3 shows a modification of my invention wherein a rocking and otherwise movable sector relative to the bushing is employed.

Fig. 4 shows a cross section through an intermediate portion 4—4 of the king bolt illustrating the bolt lightening recesses.

In the drawing is shown a fragmentary view of the steering knuckle comprising an axle end 1 provided with an eye 2 through which extends a king pin 3, pinned rigidly to the axle by a key 4. A yoke steering knuckle 5 is rockingly secured to the king pin by an upper clevis jaw 6 and a lower clevis jaw 7, having disposed therein an upper bushing 8 and the lower bushing 9, housing a knife edge formed bearing element contacting with substantially axially situated bearing surfaces at the king pin ends.

The upper jaw 6 comprises an annular flange externally threaded as indicated at 10 and is provided with a central bore within which the bushing 8 is non-rotatably secured by means of lugs 11 which project from the upper face of the jaw and engage diametrically disposed recesses provided therefor in a radially extending flange 12 of bushing 8. The bushing 8 is preferably press-fitted in place and so engages the lugs 11 that clearance is provided between the lower face of the bushing and the upper face of the jaw 6 thereby obviating the necessity for finish machining the surfaces. The lower clevis jaw 7 is provided with a central bore terminating in an enlarged concentric bore at the upper face thereof axially aligned with the bore provided in jaw 6 and having disposed therein preferably by press-fitting, a bushing 9 provided with a radially extending flange 45 recessed within the enlarged bore portion of the jaw so as to prevent relative downward movement of the bushing. The inner wall of bushings 8 and 9 is similarly formed and comprises a longitudinally extending sector 13 comprehended between the radial surfaces 14 which together with the arcuate wall 15 form the inner portion of the bushing. A longitudinally extending slot is formed in sector 13 within which is movably disposed a knife edge formed bearing element 16.

The bearing element 16 is generally rectangular in shape with a curved upper edge 17, and a knife edge formed lower end 18, and is preferably composed of hardened rustless or stainless carbon chromium steel although any suitably hardened bearing material may be employed. It is to be noted that the ends of the knife edge 18 are beveled to eliminate any tendency to wedge or bind as the element 16 is rocked relative to the bushing, and also to ensure that the bearing contact will be entirely within a hardened bearing surface if a bearing plate is inserted within a recess in the king pin end. The king pin ends 19 and 20 are semi-cylindrical in shape, disposed oppositely at the ends of the king pin with the bearing surface substantially in the plane of the pin axis. A bearing plate 21 preferably composed of hardened rustless or stainless carbon chromium steel is inserted within a recess provided therefor in the ends 19 and 20. Although I prefer to use such bearing plates due to the obvious advantages of hardening and finishing a relatively small surface, it is understood that these may be dispensed with and the cylinder ends themselves compose the bearing surface. An internally threaded cap 22 engages the externally threaded portion 10 of upper clevis jaw 6 and abuts the top flange 12 of bushing 8 and prevents the entry of grit or other foreign substances to the bearing surface. It is to be observed that clearance is provided between the inner face of cap 22 and the outer end of the knife edge bearing element 16 and also between the said face and the king pin, in order to permit a slight relative longitudinal movement therebetween. It is to be observed further that as the knife edge bearing element 16 is rocked longitudinally that it will necessarily move axially a relatively slight distance towards or from the inner face of cap 22 and sufficient clearance is provided to accommodate this movement.

The axle eye 2 is provided at its upper end with an enlarged concentric bore preferably provided with a shoulder flaring downwardly to the bore within which the king pin 3 is disposed at the bottom thereof as indicated at 23. A spring 24 seats upon the frustro conical base 23 and bears against a frustro conical shaped, preferably sheet metal washer 25 and thereby forces the packing ring 26 wedgingly against the bottom face of bushing 8 and the pin 3. This provides an effective seal to prevent the entry of grit and other foreign substances to the bearing surface which might cause abrasive action. It will be noted that the packing exerts both a radial and a longitudinal pressure against its contacting surfaces and thereby provide an effective sealing medium in variant relative positions.

A ball bearing 27 rests upon the upper face of lower clevis jaw 7 and supports and engages the lower face 28 of axle eye 2. Although I have shown a ball bearing it is understood that a roller bearing may be used if desired.

A cage 29 preferably formed of sheet metal encloses the bearing 27 in such manner as to prevent the entry of foreign material thereto. The upper bearing race and the conforming portion of the cage are preferably flared inwardly as indicated at 30 to form a seat for a packing ring 31 which is held in spring-pressed relation therewith by the normally compressed spring 32, both of which are housed in an annular recess provided in axle eye 2 and spaced radially from the king pin bore provided therein, with the spring 32 seating against the bottom of said recess. The cage 29 thus effectively seals the bearing 27 inasmuch as the lower portion of the cage is tightly secured intermediate the lower ball race and the upper faces of clevis jaw 7 and bushing 9 whereas, the inclined upper portion of the cage is tightly secured against the packing ring 31 as previously described.

The upper ball race abuts against the face 28 of axle eye 2 and thereby sustains substantially all of the vertical load which is primarily the sprung weight of the car. A recess is provided at the lower end of bushing 9 within which are tightly secured packing discs 33 which engage the lower end of the bushing in leak-proof relation therewith. It will be observed that sufficient clearance is provided between the discs 33 and king pin end 20 and also the lower end of bearing element 16 to permit longitudinal movement of these members relative to the bushings, as previously described.

A preferably sheet metal hub guard 34 substantially encloses the outwardly exposed portion of the king pin and knuckle assembly and loosely engages a wheel spindle 35 integral with and extending laterally of the yoke steering knuckle 5. The guard 34 also ensures that the discs 33 will remain in position in the recess provided therefor at the bottom of bushing 9. A laterally and inwardly extending arm 36 is integrally secured to the steering knuckle 5 and adapted to engage a drag link whereby the knuckle may be actuated for steering.

A recess 37 is preferably provided intermediate the king pin 10 and on either side of the king pin axis in order to relatively lighten the weight of the king pin and also to more effectively concentrate the thrust transmitted from the axle to the king pin through the projecting portion 38 which is best illustrated at Fig. 4.

Relative to the operation of the bearing it will be observed that the load due to the weight of the car is absorbed mainly by the ball bearing, or a roller bearing may be employed if desired other than the lateral component of the vertical load which is taken by the knife edge bearing due to the slight inclination from the vertical of the king pin. This lateral component ensures that the lower knife element 9 will engage bearing surface 21 with sufficient pressure to remain in its normal position.

The king pin bearings therefore are adapted primarily to absorb the oscillating or rocking motion due to steering and the hammering action due to road shocks and uneven roads which will cause the wheel spindle 35 to exert a leverage couple against knife edge bearing through the upper and lower clevis jaws. As the wheel is subjected to shocks the wheel spindle 35 will tend to move upwardly about a horizontal axis and therefore exert a force which will be directed towards the right (as shown in Fig. 1), by bearing element 16 against bearing surface 21.

At the lower portion of the steering knuckle the force will be directed towards the left as viewed in Fig. 1 and will cause the knife edge bearing element 16 to direct a force against the bearing surface 21. Thus, the bearings are placed so as to absorb the lateral or horizontal thrust of opposed directions, and the surface of contact between the knife edge bearing element and the bearing surface is at the axis of the king pin which will permit the knife edge element 16 to rock radially therewith without subjecting the king pin to a torsional action. Although the element 16 is spoken of as having a knife edge along surface 21 it is desirable that the edge be slightly rounded to lengthen the wearing qualities of the edge. It is to be observed that the rocking edges of the knife edge elements 17 are substantially in vertical alignment and after permitting a slight rotative movement of the wheel spindle about a horizontal axis will tend to bring the wheel back into the normal position. It is further to be observed that, by combining a radial movement about the axis of the king pin and a longitudinal movement relative thereto, which may be independent or concurrent, that a universal motion of the wheel may be effected.

As will be more clearly seen from Fig. 2, chambers 45 are formed on either side of sector 13 and the bearing surface 19, which could be packed with lubricant if desired although I do not contemplate that it will be necessary to employ lubricant in this type bearing. The angle between the knife edges of bearing element 16 is preferably somewhat less than the angle between the faces 14 of the sector 13 to ensure that faces 14 will engage the bearing ends of the king pin rather than the knife edge surfaces and obviate any tendency to bind. A slight clearance is also provided between the knife edge 18 and bearing plate 19 when the apex of the knife edge is slightly rounded which is relatively increased with the curvature of the knife edge point since otherwise, there would be a tendency to bind with the sector in other than a normal position or the position shown, due to the fact that the point of contact shifts very slightly laterally of the king pin axis and since a line through the point of contact to the bushing walls is then slightly greater than the diameter of the interior of the bushing, clearance must be provided to accommodate this difference.

Figure 3 illustrates a modification of my invention, wherein I employ a somewhat similar construction utilizing a knife edge bearing sector which is relatively movable both as to the bushing and the semi-cylindrical king pin ends. In this construction I have also shown a semi-cylindrical king pin end 39 where in the plane surface of the king pin end is the bearing against which the movable sector presses and eliminates the use of an inserted bearing plate. The movable sector 40 is shown with a slight clearance between the arc of the sector and the bushing inasmuch as the knife edge 41 is preferably slightly rounded and consequently a slight clearance must be provided as hereinbefore explained.

The bushing 42 as employed in this modification will have a cylindrical inner wall within which both the movable sector 38 and the king pin end are disposed in bearing engagement. The bushing will be non-rotatably secured to the clevis jaws as previously described. The angle between the included knife edge bases 43 is preferably somewhat less than that between the sector bases 44 to ensure that bases 42 will contact the bearing face of king pin end 37 and thereby prevent knife edge faces 41 from so contacting and eliminating a tendency to bind. The surface between bases 41 and 42 is preferably undercut as indicated to facilitate the finishing operation. Due to the frictional pressure between the bushing 40 and the arc portion of sector 38, the sector will rock therewith similarly to sector 13 in Fig. 2 to a limited point. If the wheel is turned beyond this point the base 42 will engage the bearing surface of the king pin end and will be moved relative to the bushing. Thus if the wheel is turned to a greater degree than normally, the turning movement will not be definitely stopped but will be retarded. Thus, the movable sector construction provides a means of substantially limiting the normal rocking movement of the wheel and knuckle and yet permits of a relatively greater degree of turning when necessary. The sector 38 is curved longitudinally along the upper surface which contacts the bushing 40 similarly to knife edge bearing element 16, thus permitting a universal movement, as previously described.

Thus the movable sector structure illustrated in Fig. 3 permits movement of the sector relative to both the king pin end and the bushing and permits of a universal movement in any of these relative positions.

Although I have shown and described embodiments of my invention, I contemplate numerous other embodiments without departing from the scope of my invention and the appended claims. Having thus described my invention what I claim is:

1. A hinge bearing comprising a pin provided with oppositely facing laterally disposed longitudinally displaced bearing surfaces, a yoke member encircling said bearing surfaces, knife edge bearing elements making laterally rocking contact with said surfaces and disposed intermediate the bearing surfaces and the yoke ends whereby the yoke may oscillate radially of the pin.

2. A hinge bearing comprising a pin provided with oppositely facing laterally disposed longitudinally displaced bearing surfaces, a yoke member encircling said bearing surfaces, knife edge bearing elements making laterally rocking contact with said surfaces and disposed intermediate the bearing surfaces and the yoke ends whereby the yoke may oscillate radially of the pin, the said pin bearing surfaces having bearing portions disposed substantially axially thereof.

3. A hinge bearing comprising a pin provided with substantially axially and oppositely disposed bearing surfaces, a yoke member encircling said bearing surfaces at the yoke ends, oppositely disposed straight edged bearing elements making laterally rocking engagement with said bearing surfaces and provided with longitudinally curved surfaces adapted to engage said yoke ends whereby the bearing elements may longitudinally rock to permit proper straight edge engagement between each of said elements and said bearing surfaces.

4. A king pin bearing comprising a king pin provided with substantially semi-cylindrical ends, a bearing bushing encircling said ends, a knife edge bearing element substantially axially and rockingly engaging the said pin ends and adapted to engage the bushing walls.

5. A king pin bearing comprising a king pin provided with opposite ends having relatively oppositely facing bearing surfaces, a bearing bushing encircling said ends, a straight edge bearing element for each end substantially axially and rockingly engaging said bearing surfaces along the straight edge, and relatively non-rotatably engaging with said bushing.

6. A king pin bearing comprising a king pin provided with opposite ends having relatively oppositely facing bearing surfaces, a bearing bushing encircling said ends, a straight edge bearing element for each end substantially axially and rockingly engaging said bearing surfaces along the straight edge, and relatively non-rotatably engaging with said bushing, the straight edged element being provided with a curved back portion adapted to engage the said bushing and to rock longitudinally therewith.

7. A king pin bearing comprising a king pin provided with substantially semi-cylindrical ends, a bearing bushing encircling the said ends, a knife edge bearing sector substantially axially and rockingly engaging the pin ends and axially movable relative to the said bushing.

8. The king pin bearing substantially as described in claim 7, characterized by the knife edge bearing sector being provided with a longitudinally curved portion whereby it may rock longitudinally of said bushing.

9. A king pin bearing substantially as described in claim 7, characterized by the included angle between the radial sides of the sector being relatively greater adjacent the curved base of the sector than between the knife edge sides whereby the knife edge sides will be prevented from coming into binding contact with the pin ends.

10. A king pin mechanism comprising an axle eye, a pin rigidly secured thereto and provided with oppositely disposed substantially semi-cylindrical ends providing bearing surfaces, a yoke member encircling the said pin bearing surfaces at the yoke ends, a knife edge element disposed intermediate the yoke and the pin bearing surfaces and engaging the said surfaces substantially axially thereof, and a bearing intermediate the lower yoke end and the axle eye adapted to absorb substantially the vertical load.

11. A king pin mechanism comprising an axle eye, a pin rigidly secured thereto in a generally vertical position, and provided with oppositely disposed substantially semi-cylindrical ends providing bearing surfaces, a yoke member encircling the said pin bearing surfaces at the yoke ends, a knife edge sector provided with a longitudinally curved portion and disposed intermediate the pin end bearing surfaces and the yoke ends and adapted to engage the said bearing surfaces substantially axially thereof and to rock relatively longitudinally of the yoke ends thereby permitting a limited universal movement between said sector and the pin, a bearing intermediate the lower yoke end and the axle eye designed substantially to take the vertical thrust, and means to effectively seal the said bearing elements against the ingress of abrasive foreign substances.

12. A king pin mechanism comprising an axle eye, a pin keyed thereto and provided with substantially semi-cylindrical oppositely disposed ends providing bearing surfaces, a yoke member provided with aligned bores at the yoke ends, bushings integrally secured within the said bores, rocking bearing elements adapted to engage the said bearing surfaces substantially axially thereof and to rock longitudinally of the bushing walls disposed intermediate the bushings and the pin, a ball bearing disposed intermediate the lower face of the axle eye and the upper face of the lower yoke end, cap members removably and sealingly engaging the outer faces of the bushings, spring-pressed packing elements engaging the inner face of the upper bushing and disposed in a recess provided therefor in the axle eye, a sheet metal cage generally enclosing the ball bearings and sealingly disposed intermediate the upper face of the lower bushing and the ball bearing, spring-pressed packing means disposed in a recess provided therefor in the lower portion of the axle eye, whereby the bearing elements are effectively sealed against the ingress of foreign substances, an integrally secured wheel spindle extending outwardly and laterally from the yoke member, an arm extending inwardly and laterally from the yoke member and adapted to engage a drag link connection.

13. The king pin mechanism substantially as set forth in claim 12, characterized by a preferably sheet metal guard substantially enclosing the said mechanism.

14. The king pin mechanism substantially as set forth in claim 12, characterized by the rocking bearing elements, being composed of hardened rustless steel, and the bearing surfaces composing hardened rustless steel plate inserted in recesses provided therefor in the semi-cylindrical pin ends.

15. The king pin mechanism substantially as set forth in claim 12, characterized by the said bushings being each formed with interior walls circular for substantially three-quarters thereof terminating in a sector-shape portion provided with a longitudinally extending slot within which is movably disposed said rock bearing element.

16. In a steering wheel bearing mechanism in combination with the steering axle of an automotive vehicle and a steering vehicle wheel associated therewith, a king pin substantially rigidly supported by an end of said axle and having upper and lower ends projecting therefrom, said ends being relieved on relatively opposite sides, the upper end being relieved on the side towards said vehicle wheel and the lower end being relieved on the side disposed away from said vehicle wheel, a wheel supporting yoke having relatively axially aligned bored yoke arms each encompassing a different end of the king pin, a pair of rocking bearing elements each within a different one of said arm bores and making rocking bearing engagement with the corresponding relieved pin end surface, each bearing element having an outer back surface receiving rocking movement from its associated arm.

17. The bearing mechanism substantially as defined in claim 16, characterized by said rocking bearing elements having longitudinally concaved back sides and straight edged bearing surfaces, said bearing surfaces making substantial engagement with said pin ends.

18. The bearing mechanism substantially as set forth in claim 16, characterized by said axle end being relieved from engagement with said pin to provide an annular recess around said pin at the upper portion of said axle end, annular sealing means making annular sealing engagement with an inner surface of the upper of said bored arms, and resilient means within said annular recess urging said sealing means into strong sealing engagement with the walls of said annular recess and said arm.

19. The mechanism substantially as set forth in claim 16, characterized by said axle end being provided with annular end recesses, and packing means disposed within the recesses for restraining loss of lubricant from and the ingress of foreign substances to the rocking bearing surfaces.

OSCAR U. ZERK.